United States Patent
Degerstrom et al.

(10) Patent No.: US 6,404,223 B1
(45) Date of Patent: Jun. 11, 2002

(54) SELF-TERMINATING CURRENT MIRROR TRANSCEIVER LOGIC

(75) Inventors: Michael John Degerstrom; Barry K. Gilbert, both of Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 09/766,758

(22) Filed: Jan. 22, 2001

(51) Int. Cl.[7] ................. H03K 19/0175; H03K 17/16
(52) U.S. Cl. ................. 326/30; 326/86; 326/115; 327/108
(58) Field of Search ................. 326/23, 73, 74, 326/114, 115, 30, 86, 83; 327/53, 108, 109

(56) References Cited

U.S. PATENT DOCUMENTS

| | | | |
|---|---|---|---|
| 3,930,172 A | 12/1975 | Dobkin | 307/297 |
| 4,004,164 A | 1/1977 | Cranford, Jr. et al. | 307/297 |
| 4,473,794 A | 9/1984 | Early et al. | 323/315 |
| 4,883,988 A | 11/1989 | Ide et al. | 307/443 |
| 4,965,469 A | 10/1990 | Kondoh et al. | 307/446 |
| 4,988,898 A | 1/1991 | Jansson | 307/475 |
| 5,030,855 A | 7/1991 | Leung | 307/475 |
| 5,235,222 A * | 8/1993 | Kondoh et al. | 307/475 |
| 5,276,359 A | 1/1994 | Chiang | 307/311 |
| 5,367,210 A | 11/1994 | Lipp | 326/26 |
| 5,469,080 A | 11/1995 | Son | 326/81 |
| 5,568,064 A | 10/1996 | Beers et al. | 326/31 |
| 5,576,638 A | 11/1996 | Yada | 326/62 |
| 5,578,939 A | 11/1996 | Beers et al. | 326/30 |
| 5,608,339 A | 3/1997 | Fujiwara | 326/27 |
| 5,614,867 A | 3/1997 | Cotreau | 330/288 |
| 5,666,078 A | 9/1997 | Lamphier et al. | 327/108 |
| 5,703,478 A | 12/1997 | Main | 323/315 |
| 5,729,156 A | 3/1998 | Lim | 326/73 |
| 5,760,601 A | 6/1998 | Frankeny | 326/30 |
| 5,761,244 A | 6/1998 | Hedberg | 375/257 |
| 5,774,014 A | 6/1998 | Stecker et al. | 327/546 |
| 5,815,107 A | 9/1998 | Frankeny et al. | 341/159 |
| 5,892,388 A | 4/1999 | Chiu | 327/543 |
| 5,898,297 A | 4/1999 | Bosnyak et al. | 323/315 |
| 5,923,276 A | 7/1999 | Frankeny et al. | 341/155 |
| 5,933,024 A | 8/1999 | Lim | 326/73 |
| 6,144,218 A * | 11/2000 | Smith et al. | 326/32 |

* cited by examiner

*Primary Examiner*—Michael Tokar
*Assistant Examiner*—Daniel D. Chang
(74) *Attorney, Agent, or Firm*—Faegre & Benson LLP (57) ABSTRACT

A self-terminating FET digital logic receiver for impedance-matched interconnection to a transmission line having a uniform characteristic impedance. The receiver includes an input terminal, a current mirror formed by first and second FETs, and a load. First and second non-zero current level digital logic signals are received from the transmission line at the input terminal. The first current mirror FET is connected to the input terminal and configured to provide nonlinear current/voltage characteristics between the first and second current levels which approximate the characteristic impedance of the transmission line. Substantially all the current of the digital logic signals is therefore absorbed by the first FET to minimize signal reflections on the transmission line. The second FET is connected to the first FET to provide a mirror current having current levels proportional to the current levels of the digital logic signals. The load is connected to the second FET of the current mirror, and produces voltage level signals representative of the digital logic signals.

13 Claims, 6 Drawing Sheets

Fig. 6

SELF-TERMINATING CURRENT MIRROR TRANSCEIVER LOGIC

BACKGROUND OF THE INVENTION

1. Field of the Invention

The present invention relates generally to digital logic receivers and transmitters.

2. Description of the Related Art

Transmitters and receivers (or transceivers when paired) for generating and receiving digital logic signals which are transmitted over transmission lines, are well known and in widespread use. Common circuit configurations for these devices include Low Voltage Differential Signaling (LVDS), Emitter Coupled Logic (ECL) and Pseudo Emitter Coupled Logic (PECL), Current Mode Logic (CML), Gunning Transceiver Logic (GTL) and Full Swing CMOS. A number of different transmitter, receiver and related circuits are disclosed, for example, in the following U.S. Patents:

| Inventor | U.S. Pat. No. |
|---|---|
| Dobkin | 3,930,172 |
| Cranford et al. | 4,004,164 |
| Early et al. | 4,473,794 |
| Ide et al. | 4,883,988 |
| Kondoh et al. | 4,965,469 |
| Jannsson | 4,988,898 |
| Leung | 5,030,855 |
| Chiang | 5,276,359 |
| Lipp | 5,367,210 |
| Son | 5,469,080 |
| Beers et al. | 5,568,064 |
| Yada | 5,576,638 |
| Beers et al. | 5,578,939 |
| Fujiwara | 5,608,339 |
| Cotreau | 5,614,867 |
| Lamphier et al. | 5,666,078 |
| Main | 5,703,478 |
| Lim | 5,729,156 |
| Frankeny | 5,760,601 |
| Hedberg | 5,761,244 |
| Stecker et al. | 5,774,014 |
| Frankeny et al. | 5,815,107 |
| Chiu | 5,892,388 |
| Bosnyak et al. | 5,898,297 |
| Frankney et al. | 5,923,276 |
| Lim | 5,933,024 |

Current mode logic transceivers, those in which the digital logic states are represented by current signals having two or more different predetermined levels or magnitudes, are disclosed, for example, in the Leung U.S. Pat. No. 5,030,855 and the Beers et al. U.S. Pat. No. 5,578,939. The Leung patent is directed to a transceiver for communication across a capacitively loaded line, and includes a receiver having a current mirror. The current mirror includes a pair of similar transistors, one of which is in a configuration known as a "diode-connect" circuit. The diode connect configuration is said to minimize the voltage swing developed on the capacitive line to enable high speed communication.

The Beers et al. U.S. Pat. No. 5,578,939 is directed to a bi-directional transmission line driver/receiver. The receiver has an active terminator which includes a terminating FET for sinking the current sourced by the driver. The impedance of the terminating FET is said to be controlled by another FET in response to a bias voltage signal to adjust the impedance of the terminating FET to match the impedance of the transmission line. The bias voltage signal is provided by a reference generator to set the impedance family and current magnitude interactively and continuously using a separate reference line as a feedback path.

There remains, however, a continuing need for improved current mode logic transceivers and associated components. A transceiver capable of reliable and high-quality data communications at data transfer rates approaching and exceeding those in the range of a gigabit per second over relatively low impedance (e.g., 30–50 ohms) transmission lines would be desirable. A transceiver of this type which can operate at relatively low current levels (e.g., less than about 5 mA) would be especially desirable. Such a transceiver which can be relatively efficiently implemented (e.g., CMOS with few transistors) while at the same time offering robust manufacturing characteristics is preferred. Still further advantages would be provided if the transceiver was self-terminating so that metal interconnects in the packages in which they are enclosed do not behave as electrical stubs.

SUMMARY OF THE INVENTION

The present invention is an improved logic receiver for interconnection to a transmission line having a uniform characteristic impedance. The receiver can be efficiently implemented using conventional CMOS and other transistor technologies and is robust to manufacturing variations. Simulations have demonstrated the receiver's capability of reliably achieving data transfer rates exceeding 2.5 gigabits per second over a 30 ohm transmission line at current levels between 1 and 3 mA.

One embodiment of the receiver includes a transmission line input terminal for receiving first and second non-zero current level digital logic signals (i.e., predefined logic level currents), a current mirror and a load. The current mirror includes first and second FETs. The first FET is connected to the transmission line input terminal and configured to provide nonlinear current/voltage characteristics between the first and second current levels which approximate the characteristic impedance of the transmission line so the first FET absorbs the current of the digital logic signals. The second FET is connected to the first FET and provides a mirror current having current levels proportional to the current levels of the digital logic signals. The load, which is connected to the second FET of the current mirror, receives the mirror current and produces voltage level signals representative of the digital logic signals. In a preferred embodiment, the first FET has a gate which is connected to the drain, and the channel is sized so the FET approximates the characteristic impedance of the transmission line over the predefined logic level currents.

DETAILED DESCRIPTION OF THE PREFERRED EMBODIMENTS

Figure 1:
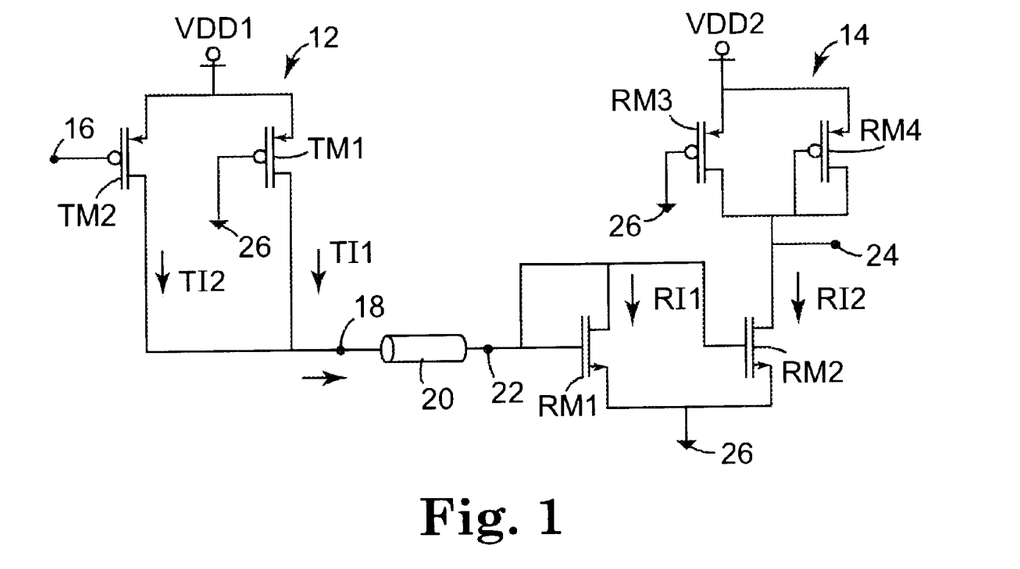
FIG. 1 is a schematic diagram of a receiver and transmitter in accordance with the present invention.

A transmitter 12 and current mirror receiver 14 in accordance with the present invention are illustrated schematically in FIG. 1. Briefly, transmitter 12 has a logic select input terminal 16 and a transmission line output terminal 18. Voltage level control signals representative of the desired logic states of the data signals to be produced by transmitter 12 (e.g., digital "0"s and "1"s) are applied to input terminal 16. In response to the signals applied to terminal 16, transmitter 12 produces current level data signals representative of the desired logic states (e.g., $I_0$ for a digital "0" or second current level digital logic signal, and $I_1$, for a digital "1" or first current level digital signal). Output terminal 18 is connected to a transmission line 20 to couple the data signals to receiver 14. Receiver 14 has a transmission line input terminal 22 and a logic control output terminal 24. Terminal 22 is connected to receive the current level data signals from the transmission line 20. In response to the signals received at terminal 22, receiver 14 produces voltage level logic control signals representative of the logic states of the data signals. As discussed in greater detail below, the receiver 14 is configured to sink or absorb all the current of the digital data signals received at the input terminal 22. The receiver is therefore self-terminating, and among other advantages is capable of receiving very high-speed data communications.

Transmitter 12, which functions as an output buffer, is formed by a pair of P-channel field effect transistors (FETs) TM1 and TM2 having their sources connected to a first transmitter supply potential VDD1 and drains connected to the transmission line output terminal 18. The gate of transistor TM1 is connected to a second transmitter supply potential represented by ground 26. The gate of transistor TM2 is connected to the logic select input terminal 16.

The illustrated configuration of transistor TM1 causes this device to continuously be in its on state, and producing a current flow of magnitude TI1. The logic select signals applied to transistor TM2 cause this device to switch between its on and off states as a function of the desired states of the digital logic signals to be produced by the transmitter 12. When in its on state, the transistor TM2 produces a current flow of magnitude TI2. When in its off state the transistor TM2 produces a current flow of zero magnitude.

Transmitter 12 is configured for current mode operation, with the magnitude of the sum of currents TI1 and TI2 outputted to terminal 18 representing the states of the digital data signals. In one embodiment a logic 1 or high state is represented by the magnitude of current TI1 when the logic select signal causes transistor TM2 to be switched off (i.e., $I_1$, the first current level digital logic signal, is equal to TI1). A logic 0 or low state is represented by the magnitude of the sum of currents TI1 and TI2 when the logic select signals cause transistor TM1 to be switched on (i.e., $I_0$ the second current level digital logic signal, is equal to TI1+TI2).

Receiver 14, which functions as an input buffer, is formed by N-channel FETs RM1 and RM2 and P-channel FETs RM3 and RM4. Transistors RM1 and RM2 are configured to function as a current mirror, and have their gates and the drain of transistor RM1 connected to the input terminal 22. The drain of transistor RM2 is connected to output terminal 24. The gate of transistor RM3 is connected to ground 26. The sources of transistors RM1 and RM2 are connected to ground 26 (i.e., a first receiver supply potential). Transistors RM3 and RM4 are configured as a load, and have their drains and the gate of transistor RM4 connected to the output terminal 24. The sources of transistors RM3 and RM4 are connected to a second receiver supply potential VDD2.

The digital logic signals received at input terminal 22 produce a current RI1 through transistor RM1 which is proportional in magnitude to the magnitude of the current of the digital logic signals. Due to the current mirror configuration of the receiver 14, a mirror current RI2 which is proportional in magnitude to the magnitude of current RI1 is produced through transistor RM2. The current RI2 is drawn through the load formed by transistors RM3 and RM4, resulting in a voltage drop across the load to produce voltage level logic control signals at terminal 24 which are representative of the logic states of the digital signals received at input terminal 22. To reduce power consumption, transistor RM2 is typically sized to produce a current RI1 having magnitudes lower than (e.g., one-tenth) those of RI1.

An important feature of receiver 14 is the configuration of the current mirror to provide nonlinear current/voltage characteristics at both the first and second current levels of the digital logic signals received at terminal 22 (i.e. over the effective current operating range of the receiver). The input impedance of the receiver 14 will thereby approximate the characteristic impedance $Z_0$ of the transmission line 20, with the current mirror absorbing or sinking substantially all the current of the logic signals at both logic states. This configuration is achieved in a preferred embodiment of the invention by manufacturing the channel (not separately shown) of transistor RM1 with a size which will provide the desired electrical characteristics. This function is achieved by the current mirror effectively operating in a "passive" configuration in that there is no mirror current control signal or mirror current adjustment capability.

Figure 2:
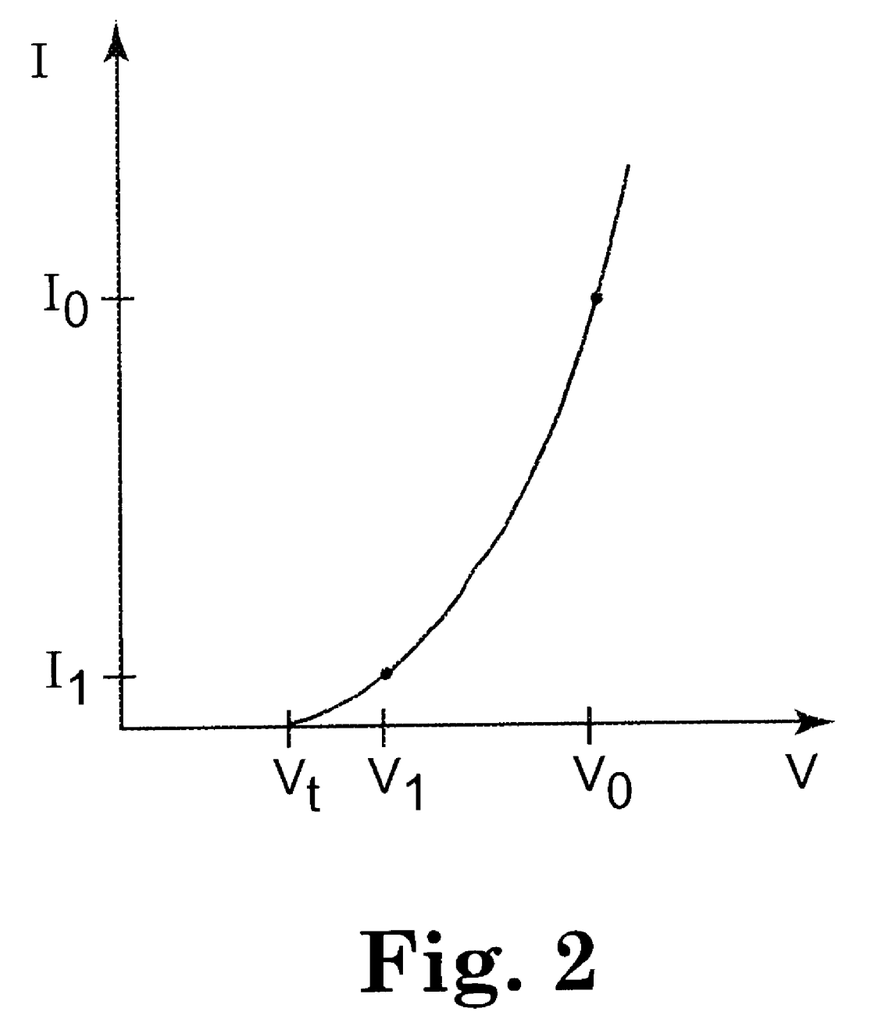
FIG. 2 is a graph of the I/V characteristics at the transmission line input terminal of the receiver shown in FIG. 1.

Transistor RM1 is configured is such a manner that it effectively functions as a forward biased diode, presenting nonlinear I/V characteristics to the digital logic signals received at terminal 22. These nonlinear I/V ($I=(V-V_t)^2$) characteristics are represented diagrammatically in FIG. 2. The desired impedance matching characteristics described above can be achieved by sizing the channel of transistor RM1 to meet the criteria described immediately below. The more closely these characteristics meet this criteria, the better the performance of the receiver 14. In effect, the receiver provides passive impedance matching since impedance control signals are not needed.

$$\frac{V_0-V_1}{I_0-I_1}=Z_0$$

Where:

$V_0$=Voltage present at terminal 22 with a logic 0 data signal $V_1$=Voltage present at terminal 22 with a logic 1 data signal $I_0$=Current present through terminal 22 with a logic 0 data signal $I_2$=Current present through terminal 22 with a logic 1 data signal $Z_0$=Characteristic impedance of transmission line 20

Figure 3:
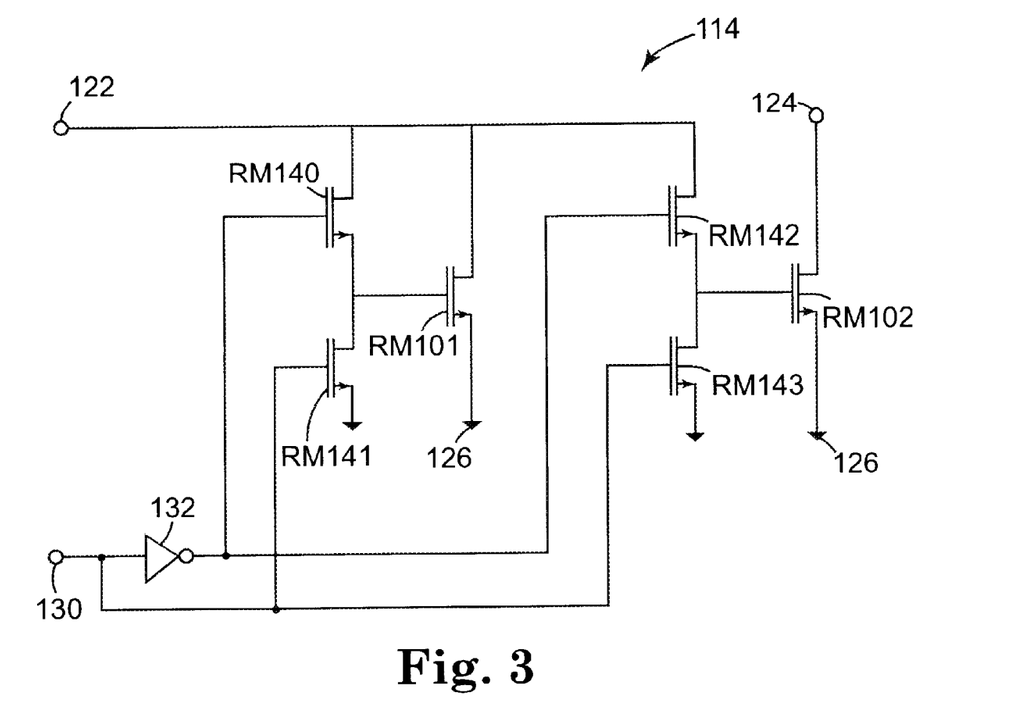
FIG. 3 is a schematic diagram of second embodiment of a receiver in accordance with the present invention which can be controllably enabled and disabled.

FIG. 3 is a schematic illustration of a receiver 114, a second embodiment of the invention. Receiver 114, like receiver 14 described above, is a self-terminating input buffer configured to sink or absorb all the current of the current mode digital data signals received at the input terminal 122. In addition, receiver 114 includes circuit elements which allow the unit to be controllably and electronically enabled and disabled through the application of enable signals at terminal 130.

Transistor RM101 of receiver 114 functions in a manner similar to transistor RM1 of receiver 14, and has its drain connected to terminal 122 and its source connected to ground terminal 126. Transistor RM102 functions in a manner similar to transistor RM2 of receiver 14, and has its drain connected to output terminal 124 and its source connected to ground terminal 126. The enable/disable function is provided by inverter 132 and transistors RM140, RM141, RM142 and RM143. Transistors RM140 and RM142 have their drains connected to terminal 122 and the drain of transistor RM101. The source of transistor RM140 and drain of transistor RM141 are connected to the gate of transistor RM101. The gates of transistors RM140 and RM142 are connected to the output terminal of inverter 132. The gates of transistors RM141 and RM143 are connected to the enable terminal 130 and the input terminal of the inverter 132. The source of transistor RM142 and the drain of transistor RM143 are connected to the gate of transistor RM102. The sources of transistors RM141, RM143 and RM102 are connected to ground terminal 126 to complete the circuit. The channel of transistor RM101 is sized to provide the I/V characteristics (and associated operational advantages) of transistor RM1 of receiver 14 described above. The channel of transistor RM102 is sized in proportion to the channel of transistor RM101 so as to mirror a small fraction of the current through transistor RM101.

When enabled by the application of a logic 0 signal to the enable terminal 130, transistors RM140 and RM142 are switched to an electrically on (i.e., conductive) state, and transistors RM141 and RM143 to an electrically off (i.e., open) state. Although not shown, a load (e.g., structurally similar to that formed by transistors RM3 and RM4 in the embodiment shown in FIG. 1) will be connected to node 124. Receiver 114 will then function as a logic receiver in a manner similar to receiver 14 described above. When disabled by the application of a logic 1 signal to the enable terminal 130, transistors RM140 and RM142 are switched to an electrically off state, and transistors RM141 and RM143 to an electrically on state. Transistor RM141 thereby pulls the gate of transistor RM101 to the voltage at ground terminal 126, which in turn causes transistor RM101 to switch to an electrically off state. Similarly, transistor RM143 pulls the gate of transistor RM102 to the voltage at ground terminal 126 which in turn causes transistor RM102 to switch to an electrically off state. The operation of receiver 114 is thereby disabled.

Figure 4:
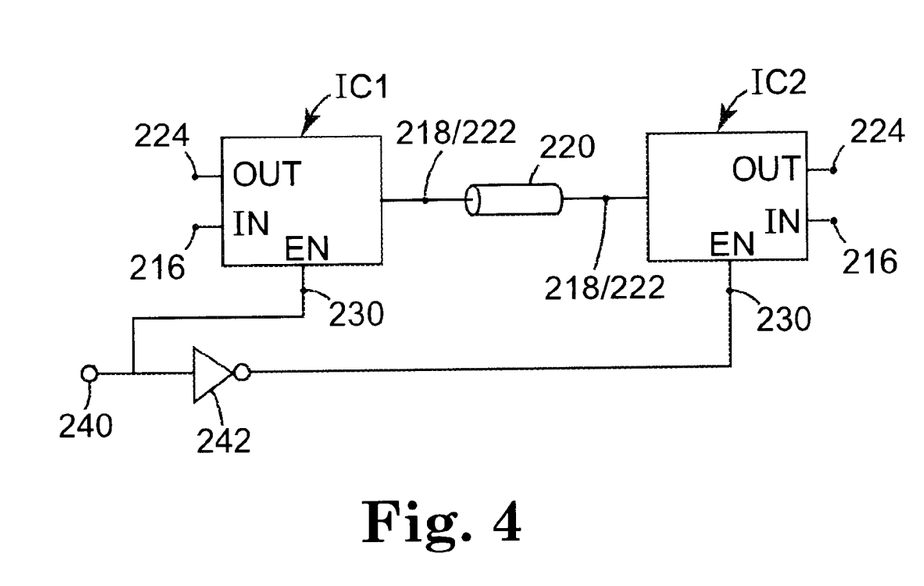
FIG. 4 is a block diagram of a pair of integrated circuits having a transceiver including a receiver and transmitter in accordance with the present invention.

FIG. 4 is an illustration of two integrated circuits IC1 and IC2 interconnected for data communications over a transmission line 220. Each IC1 and IC2 includes a transceiver including both a transmitter such as 12 (not separately shown in FIG. 4) and a receiver such as 114 (also not separately shown). Accordingly, each IC1 and IC2 includes a transmitter logic select input terminal 216, a receiver logic output terminal 224, a transmission line input/output terminal 218/222 connected to both the receiver and transmitter, and an enable terminal 230. The enable terminal 230 of each IC1 and IC2 is connected to receive a transmit/receive select signal applied to terminal 240. Terminal 240 is coupled directly to the terminal 230 of IC1, and to the terminal 230 of IC2 through inverter 242. When a first state transmit/receive select signal (e.g., a logic 1 signal) is applied to terminal 240, the transmitter is enabled and the receiver disabled for IC1 (e.g., in the manner of receiver 114 described above), while the receiver is enabled and the transmitter is disabled for IC2. Data communications from the transmitter of IC1 to the receiver of IC2 are thereby permitted when the first state transmit/receive select signal is applied to terminal 240. In other words, the logic signals applied to input terminal 216 of IC1 are converted to digital data signals which are transmitted to IC2 over transmission line 220 and converted to logic signals at the output terminal 224 of IC2. In a similar manner, the application of a second state transmit/receive select signal (e.g., a logic 0 signal) to terminal 240 enables digital data communications from the input terminal 216 of IC2 to the output terminal 224 of IC1 (i.e., the data flow direction is reversed).

Two or more receivers 114 can also be interconnected in a parallel arrangement (not shown) with their input terminals 122 and their output terminals 124 connected together, and the enable terminals 130 connected to receive individual select signals. In a multiple stage configuration of this type the number of stages in the receiver unit which are enabled will be selected to match the amount of current present in the received digital data signals that must be absorbed or sinked. The impedance of the receiver unit can thereby be selected by digital logic signals to enable the receiver to be interfaced to transmission lines of different impedances, or to tune out fabrication process variations. The circuits can be powered-down for power conservation purposes when data communications are not needed.

Figure 5:
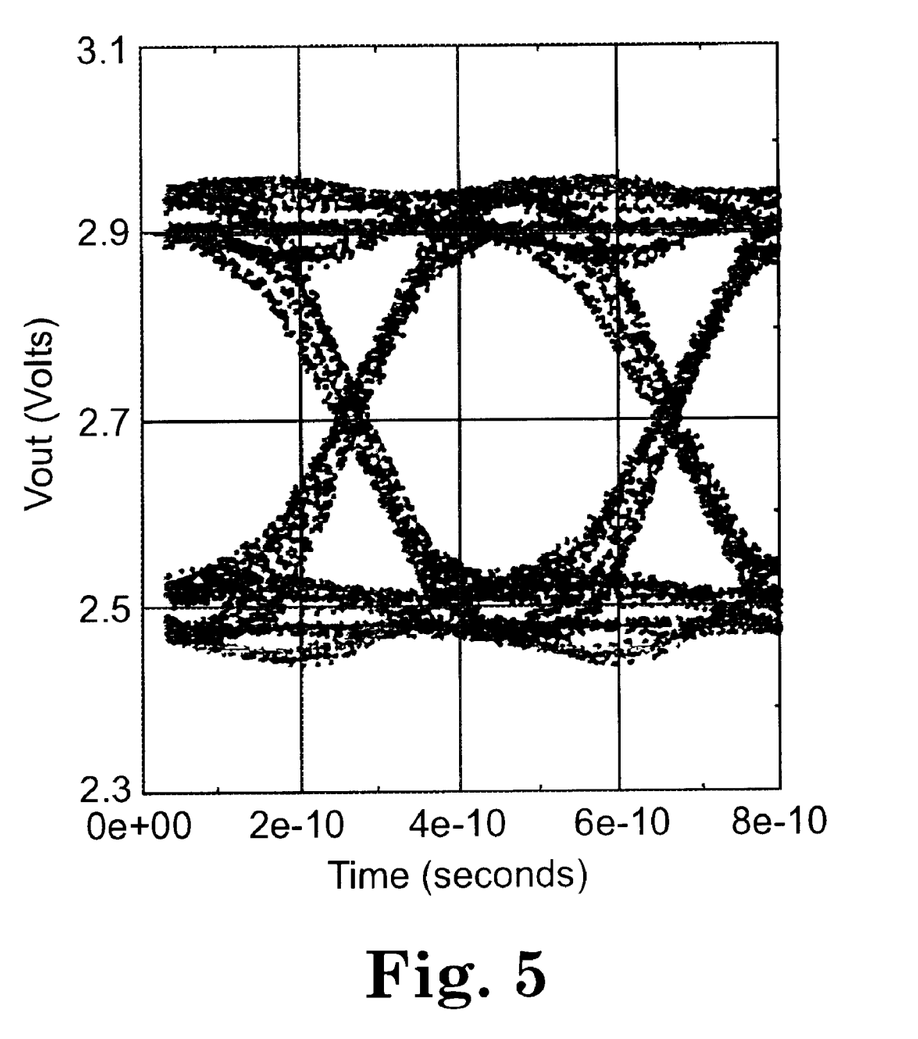
FIG. 5 is an eye diagram illustrating the electrical characteristics of a simulated implementation of the receiver and transmitter shown in FIG. 1.

FIG. 5 is an eye diagram illustrating the performance of a simulated model of transmitter 12 and receiver 14 in accordance with the present invention. The model included the use of a transmission line having a characteristic impedance $Z_0$ of 30 ohms and data signal current levels $I_1$ of 1 mA and $I_0$ of 3 mA. The transistors RM1 and RM2 were modeled as devices having channel lengths of 0.7 $\mu$m, with transistor RM1 having a width of 400 $\mu$m and transistor RM2 having a width of 50 $\mu$m. The load was modeled as a 1.7K ohm resistor. The supply potential was 3.3 V. This eye diagram represents good performance at digital data rates of 2.5 gigabits/second.

Figure 6:
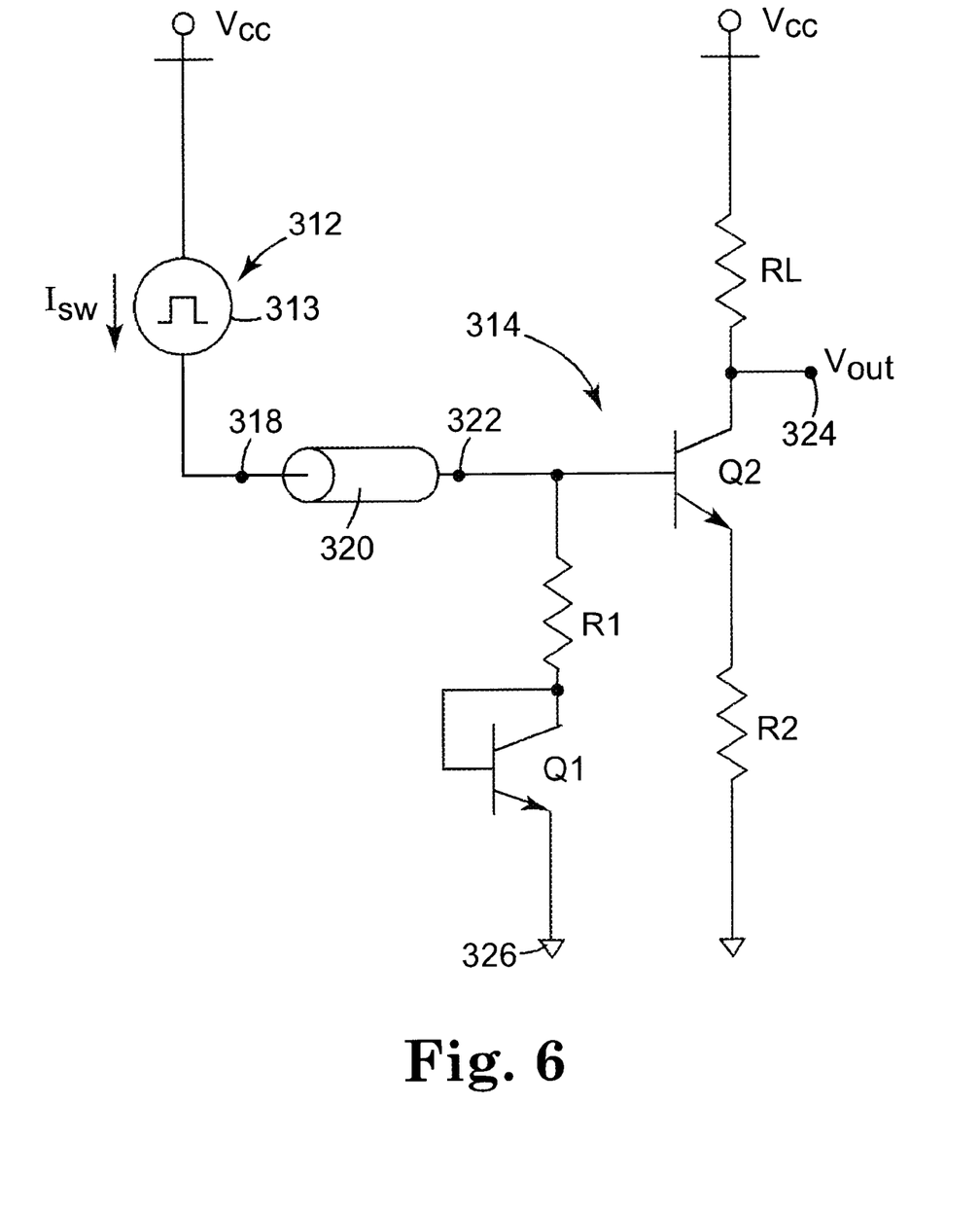
FIG. 6 is a schematic diagram of a third embodiment of a receiver in accordance with the present invention.

FIG. 6 is a schematic illustration of a receiver 314, a third embodiment of the present invention. Receiver 314 is fabricated from bipolar transistors, and like receiver 14 described above, is a self-terminating input buffer configured to sink or absorb substantially all the current of the current mode digital data signals received at the input terminal 322. Transistor Q1 of receiver 314 functions in a manner similar to transistor RM1 of receiver 14, and has its collector connected to terminal 322 through resistor R1, and its emitter connected to ground terminal 326. The base of transistor Q1 is connected to the collector of the transistor. Transistor Q2 functions in a manner similar to transistor RM2 of receiver 14, and has its collector connected to output terminal 324 and its emitter connected to ground terminal 326 through resistor R2. The base of transistor Q2 is connected to terminal 322. Output terminal 324 is connected to a supply potential VCC through load transistor $R_L$.

A transmitter 312 is represented schematically in FIG. 6 as a current source 313 which produces a current level data signal ISW having two non-zero levels representative of the desired digital logic states. A transmission line 320 couples the data signals from the output terminal 318 of the transmitter 312 to the input terminal 322 of receiver 314. The device area of transistor Q1 and its biased operating point are configured to provide the I/V characteristics of transistor RM1 of receiver 14 described above. The device area of transistor Q2 and its biased operating point are configured to mirror a portion of the current conducted through transistor Q1.

The receiver and transmitter of the present invention offer a number of important advantages. As described above, very high data transmission rates can be achieved. These performance capabilities can be achieved while at the same time offering compatibility between receivers and transmitters operated with different supply potentials as the digital signals are represented by current rather than voltage. Since the receiver is self-terminating, the metal interconnects in the packages of the circuit will not behave as electrical stubs, thereby minimizing signal reflections. The circuits can be used in low power applications. A number of different transceiver protocols including bi-directional, power-down, and impedance control capabilities can be implemented. Susceptibility to simultaneous switching noise (SSN) is relatively low. The circuits are also very compatible with low impedance transmission lines which are often easier to fabricate and offer considerably less crosstalk than that of the often specified characteristic impedance of 50 ohms. The nonlinear I–V features of the circuit which enable the desirable impedance matching characteristics are robust to manufacturing process variations. Simulations indicate that even +/–30% process variations will result in acceptable levels of impedance mismatch between the receiver and a 30 ohm transmission line.

Although the present invention has been described with reference to preferred embodiments, those skilled in the art will recognize that changes can be made in form and detail without departing from the spirit and scope of the invention. For example, the current source logic signal generation function of the transmitter and the current mirror of the receiver can be implemented with other transistor configurations. Furthermore, other transistor configurations and/or circuit elements can be used to implement the load function in the receiver.

What is claimed is:

1. A logic receiver for interconnection to a transmission line having a characteristic impedance, comprising:
   an input terminal for receiving first and second non-zero current level digital logic signals over the transmission line;
   a current mirror, including:
      a first transistor connected to the input terminal and configured to provide nonlinear current/voltage characteristics between the first and second current levels which approximate the characteristic impedance of the transmission line so the first transistor absorbs substantially all the current of the digital logic signals; and
      a second transistor connected to the first transistor for providing a mirror current having current levels proportional to the current levels of the digital logic signals; and
   a load connected to the second transistor of the current mirror, for receiving the mirror current and producing voltage level signals representative of the digital logic signals.

2. The logic receiver of claim 1 wherein the first transistor is a FET which has a gate, a source, a drain and a channel and wherein the gate is connected to one of the drain and source and the channel is sized to approximate the characteristic impedance of the transmission line over a range of the first and second current levels.

3. The logic receiver of claim 1 wherein the load includes one or more FETs.

4. The logic receiver of claim 1 and further including:
   an enable terminal for receiving enable signals; and
   one or more transistors connected to the enable terminal and the current mirror, for enabling and disabling the operation of the logic receiver in response to the enable signals.

5. The logic receiver of claim 1 wherein the second transistor provides a mirror current having current levels which are less than the current levels of the digital logic signals.

6. The logic receiver of claim 5 wherein the second transistor provides a mirror current having current levels which are less than about one-tenth the current levels of the digital logic signals.

7. The logic receiver of claim 1 and further including a transistor logic transmitter for interconnection to the transmission line, the logic transmitter comprising:
   an output terminal for providing the first and second non-zero current level digital logic signals to the transmission line;
   an input terminal for receiving logic select signals representative of the logic states of the digital logic signals to be provided at the output terminal;
   a first transistor connected to the output terminal for causing the first current level digital logic signal to be provided at the output terminal when the logic select signal is representative of a first logic state; and
   a second transistor connected between the input and output terminals for causing the second current level digital logic signal to be provided at the output terminal when the logic select signal is representative of a second logic state.

8. The logic receiver of claim 7 wherein:
   the first transistor of the logic transmitter provides the first current level signal to the output terminal; and
   the second transistor of the logic transmitter provides a current level signal to the output terminal which is summed with the first current level signal to equal the second current level signal.

9. The logic receiver of claim 1 wherein the first and second transistors are FETs.

10. The logic receiver of claim 1 wherein the first and second transistors are bipolar transistors.

11. An FET logic receiver for interconnection to a transmission line having a characteristic impedance, comprising:
    an input terminal for receiving first and second non-zero current level digital logic signals over the transmission line;
    a current mirror, including:
       first FET circuit means connected to the input terminal and configured to provide nonlinear current/voltage characteristics between the first and second current levels which approximate the characteristic impedance of the transmission line so the first circuit means absorbs substantially all the current of the digital logic signals; and
       second FET circuit means connected to the first FET circuit means for providing a mirror current having current levels proportional to the current levels of the digital logic signals; and
    a load connected to the second FET circuit means of the current mirror, for receiving the mirror current and producing voltage level signals representative of the digital logic signals.

12. The logic receiver of claim 11 wherein:
    the first circuit means comprises a single FET having gate, a source, a drain and a channel and wherein the gate is connected to one of the drain and source and the channel is sized to approximate the characteristic impedance of the transmission line; and
    the second circuit means comprises a single FET having a gate connected to the gate of the first FET.

13. An FET logic transceiver for interconnection to a transmission line having a characteristic impedance, comprising:

a transmission line terminal for coupling first and second non-zero current level digital logic signals to and from the transmission line;

an input terminal for receiving logic select signals representative of desired states of the logic signals to be provided at the transmission line terminal;

an output terminal for providing logic control signals representative of the states of the logic signals received at the transmission line terminal;

an enable terminal for receiving enable signals;

a receiver, including:

a first current mirror FET connected to the transmission line terminal and configured to provide nonlinear current/voltage characteristics between the first and second current levels which approximate the characteristic impedance of the transmission line so the first current mirror FET absorbs substantially all the current of the digital logic signals;

a second current mirror FET connected to the first current mirror FET for providing a mirror current having current levels proportional to the current levels of the digital logic signals;

a load connected to the second current mirror FET, for receiving the mirror current and causing the voltage level logic control signals to be provided at the output terminal; and         one or more enable FETs connected to the enable terminal and the first and/or second current mirror FETs, for enabling and disabling the operation of the receiver in response to the enable signals; and     a transmitter including:

a first FET connected to the transmission line terminal for causing the first current level digital logic signals to be provided at the transmission line terminal when the logic select signals are representative of a first logic state; and         a second FET connected to the input and transmission line terminals for causing the second current level digital logic signals to be provided at the transmission line terminal when the logic select signals are representative of the second logic state.

\* \* \* \* \*